United States Patent [19]

Kraus et al.

[11] Patent Number: 5,076,935
[45] Date of Patent: Dec. 31, 1991

[54] FILTRATION MEMBRANES MADE FROM POLYETHERSULFONE/PHENOXY RESIN BLEND

[75] Inventors: Menahem Kraus; Inessa Katsnelson, both of Ann Arbor, Mich.

[73] Assignee: Gelman Sciences, Inc., Ann Arbor, Mich.

[21] Appl. No.: 531,237

[22] Filed: May 31, 1990

[51] Int. Cl.$^5$ .............................................. B01D 61/14
[52] U.S. Cl. ............................... 210/651; 210/500.38; 210/500.41
[58] Field of Search .............. 210/490, 500.41, 500.28, 210/651; 427/244, 245; 264/41

[56] References Cited

U.S. PATENT DOCUMENTS 3,615,024 10/1971 Michaels .................... 210/503.41 X
4,575,385 3/1986 Brooks et al. .............. 210/500.28 X Primary Examiner—Frank Spear
Attorney, Agent, or Firm—Krass & Young

[57] ABSTRACT

Porous blended polymer (polyethersulfone, phenoxy resin) filtration membranes are provided which are useful for filtering macromolecules or particles from fluids. The invention also concerns a process for filtering matter from a fluid, employing the membranes.

20 Claims, No Drawings

FILTRATION MEMBRANES MADE FROM POLYETHERSULFONE/PHENOXY RESIN BLEND

FIELD OF THE INVENTION

This invention concerns porous polymer filtration membranes and, more particularly, high tensile strength, low melting point porous membranes which may be formed from a blend of polyethersulfone (PES) polymer and phenoxy resin. The invention also concerns a process for preparing porous membranes and a process for filtering a fluid through such a porous filtration membrane.

BACKGROUND OF THE INVENTION

Microporous and ultrafiltration membranes are well known in the particle filtration industry. The material or matrix of these membranes comprises suitable organic plastics such as nylons, polysulfones, acrylics, and the like. Their filtration mechanism is a combination of size exclusion (sieving) and absorption or adsorption on the walls of the pores inside the membrane. To be considered "microporous", the typical inner width of the membrane pores is in the range that passes macromolecules and retains particles contained in a fluid. Below this range, are "ultrafiltration" (UF) membranes which serve to filter macromolecules rather than particles, and "reverse osmosis" (RO) membranes which serve to separate ions. The smaller the pore size, the slower the rate at which a filtrate can be passed. To be useful for a particular application, the fluid flow rate through the membrane must therefore be reasonably high.

In aqueous filtration, it is desirable to have membranes that are easily wettable and that have as little leachable material as possible. Such hydrophilic membranes containing an inherently hydrophobic polyamide, polyimide or polyethersulfone polymer are described in European patent document no. 0 228 072 dated July 8, 1987.

Polyethersulfone polymer has been shown to be miscible in a common solvent (DMF or DMSO), with phenoxy resin (V. B. Singh and D. J. Walsh, J. Macromol, Sci.-Phys., B25 (1-2), 65-87, 1986). Also shown is that the melting temperature of cast films of blended PES/phenoxy resin is lowered by using more phenoxy resin (relative to PES) in the blend. Not suggested is a membrane made from such a blend nor was such a film suggested to be porous or to be useful as a filtration membrane.

SUMMARY OF THE INVENTION

We have now found that useful porous filtration membranes can be made comprising a homogeneous blend of polyethersulfone polymer and phenoxy resin polymer. We have also found unexpectedly that such blended polymer filtration membranes are hydrophobic. The hydrophobic filtration membranes of the invention can be used for many purposes, e.g., as a vent filter to keep air sterile in fermentation tanks. Whereas phenoxy resin inherently has lower tensile strength than PES polymer, we have found that filtration membranes of the invention made from blended relative amounts of PES polymer and phenoxy resin unexpectedly are substantially stronger in this regard than the PES polymer membranes. Also, the membranes of the invention have a lowered softening or melt temperature making for ease in safely melt-sealing the individual filtration membrane while retaining its porosity. For example, the membranes can be used in disc form as a housed porous filter membrane component, in a melt-compatible thermoplastic device for the membrane, such as a device of the type described in U.S. Pat. No. 4,444,661, which description is incorporated herein by reference.

DETAILED DESCRIPTION OF THE INVENTION

The invention in one preferred aspect concerns a porous filtration membrane, which preferably may be a microporous membrane or an ultrafiltration membrane. The membrane matrix comprises a homogeneous blend of polyethersulfone polymer and phenoxy resin polymer. The polyethersulfone polymer preferably comprises such polymer having the formula I

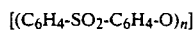

$$[(C_6H_4\text{-}SO_2\text{-}C_6H_4\text{-}O)_n] \qquad \text{I}$$

The phenoxy resin polymer preferably comprises such polymer having the formula II

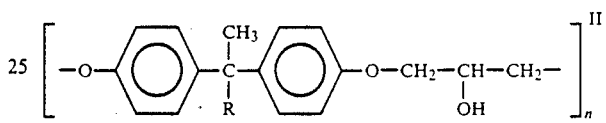

where R is methyl or ethyl, preferably a polyhydroxyether of bisphenol A or bisphenol B. A preferred membrane is one wherein the blend comprises (based on the total amount of the polyethersulfone polymer and phenoxy resin polymer included in the blend) an amount of polyethersulfone polymer, preferably about 50 to 90 wt.%, relative to the amount of phenoxy resin polymer, preferably about 50 to 10 wt.%, such that with respect to certain properties, the membrane surpasses in performance a comparable membrane made only with polyethersulfone polymer. Thus, in the preferred relative amounts, it is found that the softening or melt temperature of the membrane is advantageously lower and also the tensile strength is advantageously higher, than that of a comparable membrane made only with polyethersulfone polymer. Thus, blending polyethersulfone with phenoxy resin in a polymer membrane formulation importantly results in a stronger membrane. More specifically, the membrane should possess sufficient strength to survive various processing operations such as a slitting operation wherein the membrane is slit to the proper width to be processed further for use in flat stock and pleated devices. The increased strength also allows the membrane to be conveniently folded and pleated for insertion in a cartridge device and to resist damage when the cartridge is sterilized with steam. When so sterilized the plastic components of a membrane cartridge are subjected to significant contraction and expansion forces as the device is heated up and cooled down. These forces have a deleterious effect on the already stressed pleated folds in the membrane. Polyethersulfone is reported to have a glass transition temperature, $T_G$, of 230° C. Phenoxy resin typically begins to soften at 92° C. Preferably, for purposes of lower melt temperature and increased tensile strength, as indicated, the blend comprises about 50 to 90 wt.% of polyethersulfone polymer and about 50 to 10 wt.% of phenoxy resin polymer based upon the total amount of the polyethersulfone polymer and phenoxy resin polymer included in the blend. Preferably, for these purposes, the phenoxy resin polymer has the formula where R of formula II is methyl.

In another preferred aspect, the invention concerns a process of preparing a porous filtration membrane, which comprises forming a homogeneous blended solution of matrix solutes consisting essentially of polyethersulfone polymer and a phenoxy resin polymer in a compatible solvent, forming the resulting solution in a film, quenching the film in a suitable quenching medium, and drying the resulting film. The blend solution preferably comprises about 50 to 90 wt.% of PES polymer and about 50 to 10 wt.% of phenoxy resin polymer based upon the total amount of the PES polymer and phenoxy resin polymer included in the blend. Any of various suitable art-recognized solvents or solvent mixtures may be employed of which N-methylpyrrolidone is preferred. A suitable vehicle or additive that is compatible with the blend may also be employed, such as PEG or glycerine. Any of various suitable quenching media may be employed, among which water is preferred.

In another preferred aspect the invention concerns a process for filtering an aqueous fluid comprising causing said fluid to flow through a porous filtration membrane as described having a matrix as described comprising a homogeneous blend of polyethersulfone polymer and a phenoxy resin polymer. The membrane may be a microporous membrane or an ultrafiltration membrane. Preferably the polyethersulfone polymer comprises such polymer having the above formula I, preferably the phenoxy resin polymer comprises polymer having the above formula II. As a result of the enhanced strength of the PES/phenoxy resin blend, as described, the membrane can be made thinner, i.e., of a selected thickness that still provides suitable strength, which results in reducing the hydrodynamic resistance and imparts a faster water flow and a higher level of throughput to the membrane. The invention and the best mode of practicing the same are illustrated by the following examples of preferred embodiments of the invention.

DEFINITIONS

Water bubble point:

The water bubble point is a test to measure the largest pore size of a filter, based on the air pressure necessary to force liquid from the pores of a wetted filter. The larger the pore, the less pressure to vacate it. Air passing through the empty pore is detected as bubbles. The differential pressure to force the first bubble out is defined as the bubble point. The relationship between the bubble point pressure and the diameter of the large pores is given by:

$$p = \frac{B\gamma\cos\theta}{D}$$

where is a constant, $\gamma$ is liquid air surface tension, $\theta$ is the liquid solid contact angle and D is pore diameter.

Air Flow:

Air flow depends chiefly on the differential pressure, and on the total porosity and area of a filter. The total amount of air that can be filtered is also a function of contamination in the flow. The Gurley and Frazier tests are two common measurements of filter air flow.

Water flow:

The water flow/flux test measures the rate at which water will flow through a filter—a variable of differential pressure, porosity, and filter area. Flow rates are commonly expressed in either seconds/100 ml., gallons/minute/ feet squared or milliliters/ minute/centimeters squared at a given pressure.

EXAMPLE 1

Solutions (10% by weight) of polyethesulfone (PES) and phenoxy resin (phenoxy) each as a solution in N-methylpyrrolidone were separately prepared and from these, homogeneous crystal clear blends were prepared as follows:

|  | % | | | |
|---|---|---|---|---|
|  | A | B | C | D |
| PES | 100 | 90 | 70 | 50 |
| Phenoxy | 0 | 10 | 30 | 50 |

The polymers used were from commercial sources: the polyethersulfone was Victrex ® 5200P, I.C.I., and the phenoxy resin [4,4'-(1-methylethylidene)bisphenol, polymer with (chloromethyl)oxirane, M.W. 14,000-16,000]was UCAR ™ phenoxy resin PKHH, Union Carbide.

Films of each in 10 mil thickness were cast on a glass plate and oven dried at 110°-120° C.

Tests of the films for tensile strength showed that the PES/phenoxy blends B, C and D were each stronger than blend A (i.e., PES without phenoxy resin).

EXAMPLE 2

A modified blended formulation was prepared as follows:

|  |  | % |
|---|---|---|
| (1) | Polyethylene glycol (E-400) | 66.5 |
| (2) | Phenoxy resin, BA Kelite ® PKHH | 1.4 |
| (3) | PES, Victrex 5200P | 12.0 |
| (4) | NMP, 22.8 g | 7.6 |
| (5) | DMF, 30 g | 10.0 |
| (6) | Deionized water | 2.0 |
| (7) | Glycerine | 0.5 |

A) The phenoxy resin was added to the NMP and DMF (20g) and stirred until dissolved. The PES polymer was added to the PEG, to which the phenoxy solution was added, followed by the DMF (10g), water and glycerine. The resulting clear blend [(viscosity, 3000 cps, 74° F.)]was cast in 15 mil thickness on a flat plate, subjected to humidity, dried, and the resulting membrane was formed into 47-mm discs. The discs were hydrophobic; the ratio, phenoxy:PES, is 11.7:100. Tensile strength (parallel) of the membrane was 542, 500, 500 and 520 psi. Elongation (parallel, average $E_B$) was 13.15%. Burst pressure: 27.5, 28.0, 28.0 psi.

B) A similar formulation, except that the polymer components 2) and 3) in the blend were at 4.0 and 9.4% respectively, when cast as a membrane as in paragraph 2 A) gave improved results: burst pressure, 38-43 psi; tensiles at break, 854 and 886 psi; elongation, 31.2 and 18.3%. WBP (prewet in methanol) was 63.5, 62.5 psi; water flow (prewet in methanol), 28.9, 29.9 sec per 100 ml.

C) Polyethersulfone Membrane 0.2μ—A membrane similar to the membrane of paragraph 2 A) but differing primarily in its omission of the phenoxy resin was prepared as follows:

Polyethersulfone (Victrex TM 5200P), dimethylformamide and polyethyleneglycol 400 (used as a pore former for microporous membranes) were mixed in the ratio 13:18:69. The mixture was stirred to homogeneity and cast at 10-12 mil on glass or stainless steel. It was subjected to 60-70% relative humidity ambient air until it became opaque. The film was then immersed in water to complete coagulation and leach out excess solvent, for 2-12 hours. It was then dried at ambient to 70° C.

The membrane obtained was spontaneously water wettable. It exhibited 100% bacteria retention when challenged with $10^7/cm^2$ of Pseudomonas diminuta. The membrane had the following flow characteristics:

| Kerosene Bubble Point | 22 psi |
| Water Bubble Point | 53 psi |
| Air Flow | 2.7 lit/cm²-min at 10 psi |
| Water Flow | 23 ml/cm²-min at 10 psi |

Tensile strength and other performance characteristics of comparable polyethersulfone membranes are described in the following examples.

EXAMPLE 3

Membranes were prepared by the method of Example 2 A) having different percentages of phenoxy resin tabulated as follows:

| | Phenoxy Resin Concentration (% By Weight) | | | |
| --- | --- | --- | --- | --- |
| | 8% | 11.7% | 20.8% | 30% |
| Polyethylene Glycol | 66.1 | 66.1 | 66.1 | 66.1 |
| Phenoxy Resins | 1.0 | 1.4 | 2.3 | 3.1 |
| PES Resin | 12.4 | 12.0 | 11.1 | 10.3 |
| N-Methylpyrrolidone | 8.0 | 8.0 | 8.0 | 8.0 |
| Dimethylformamide | 10.0 | 10.0 | 10.0 | 10.0 |
| Deionized Water | 2.0 | 2.0 | 2.0 | 2.0 |
| Glycerine | 0.5 | 0.5 | 0.5 | 0.5 |

These membranes and membranes prepared without phenoxy resin by the method of Example 2 C) were compared for their relative performance characteristics with the typical result tabulated as follows:

| Phenoxy Resin Conc. % Based on PES | Water* Bubble Point psi | Water* Flow sec/100 ml | PERFORMANCE CHARACTERISTICS | | | | | | Thickness mil |
| --- | --- | --- | --- | --- | --- | --- | --- | --- | --- |
| | | | Dimensional Change After Autoclaving % | | Tensile Strength at Break (psi) $T_B$ | | Elongation at Break % $E_B$ | | |
| | | | Parallel I | Perpendicular II | Parallel I | Perpendicular II | Parallel I | Perpendicular II | |
| 0 | 60.0 ± 10 | 22 ± 3 | 1.0 | 0.5 | 597-698 | 440-526 | 25-42 | 26-43 | 4.5-6.5 |
| 8.0 | 51.6 ± 4.5 | 18.1 ± 1.3 | 1.0 | 0.3 | 808.3 ± 53.9 | 716.6 ± 55.7 | 23.8 ± 2.1 | 30.7 ± 5.8 | 4.4-5.8 |
| 11.7 | 52.0 ± 4.0 | 17.8 ± 1.3 | 1.0 | 0.7 | 870.8 ± 70.7 | 683.3 ± 91.4 | 26.1 ± 3.1 | 27.6 ± 8.2 | 3.8-4.9 |
| 20.8 | 66.3 | 21.4 | 1.7 | 1.0 | 944 | 788 | 28 ± 7 | 31 ± 9.9 | 6.3-7.4 |
| 30.0 | 51.9 ± 12.0 | 17.5 ± 2.3 | 2.3 | 1.0 | 973.4 ± 55.3 | 805.6 ± 31.5 | 21.8 ± 6.0 | 29.4 ± 4.4 | 3.8-5.3 |

*The membrane was subjected to methanol-prewetting before test.

These results show that the average water bubble points of the hydrophobic PES/phenoxy membranes (allowing for film thickness) are lower than that of the hydrophilic PES membrane disc. The results also show that the PES/phenoxy membrane discs of the invention are stronger and have a relatively higher water flow rating.

EXAMPLE 4 PES/PHENOXY ULTRAFILTRATION MEMBRANE

A homogeneous blend in N-methylpyrrolidone of 15% total resin was prepared from the following formulation:

| PES (Victrex ® 5200P) | 26.9 g | 13.43% |
| Phenoxy Resin (Phenoxy PKHH) | 3.1 g | 1.57% |
| NMP | 170.0 g | 85.00% |

For the preparation of membranes the phenoxy resin was predissolved in the NMP in a beaker on a stirplate with agitation, dissolving in about one hour. The PES was added and agitation was continued for another two hours to provide a clear blend. The blend was cast at 10 mils, immersed in ambient water right after casting, leached and air dried overnight.

The membrane appeared very shiny on the air side and less shiny on the belt side.

A water flow test was performed in a filter (Amicon ®) cell with the shiny (air) side toward the pressure. The average water flow rate was 0.98 cc/min/cm² at 40 psi.

A myoglobin solution (MW, 17,800; 0.1%) in Trismabase buffer was filtered through the membrane with the shiny (air) side up (toward the flow). The average flow rate was 0.0273 cc/min/cm² at 40 psi. The filtrate appeared clear. Spectrophotometric absorbance analysis at a wavelength of 265 nm of a 5-fold dilution of the feed and filtrate showed that the resulting UF membrane retained 99.7% of the myoglobin feed.

Having described the invention, the embodiments of the invention in which an exclusive property or privilege is claimed are defined as follows:

1. A filtration membrane having a porous isotropic matrix comprising a homogeneous blend of polyethersulfone polymer and phenoxy resin polymer.

2. The membrane of claim 1 wherein the membrane is a non-protein-rejecting microporous membrane.

3. The membrane of claim 1 wherein the membrane is an ultrafiltration membrane.

4. The membrane of claim 1 wherein the polyethersulfone polymer comprises polymer having the formula $[(C_6H_4\text{-}SO_2\text{-}C_6H_4\text{-}O)_n]$.

5. The membrane of claim 1 wherein the phenoxy resin polymer comprises polymer having the formula

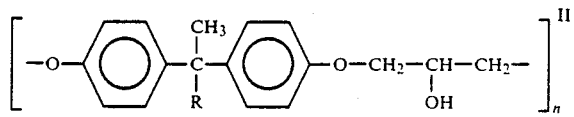

where R is methyl or ethyl.

6. The membrane of claim 1 wherein the phenoxy resin polymer comprises a polyhydroxyether of bisphenol A.

7. The membrane of claim 1 wherein the phenoxy resin polymer comprises a polyhydroxyether of bisphenol B.

8. The membrane of claim 1 wherein the blend comprises an amount of polyethersulfone polymer relative to the amount of phenoxy resin polymer such that the softening temperature of the membrane is substantially lower than that of a comparable membrane made only with polyethersulfone polymer.

9. The membrane of claim 1 wherein the blend comprises about 50 to 90 wt.% of polyethersulfone polymer and about 50 to 10 wt.% of phenoxy resin polymer based upon the total amount of the polyethersulfone polymer and phenoxy resin polymer included in the blend.

10. The membrane of claim 5 wherein the phenoxy resin polymer has the formula where R is methyl.

11. The membrane of claim 1 wherein the blend comprises an amount of polyethersulfone polymer relative to the amount of phenoxy resin polymer such that the tensile strength of the membrane is substantially greater than that of a comparable membrane made only with polyethersulfone polymer.

12. A process of preparing a hydrophobic porous isotropic filtration membrane, which comprises forming a homogeneous blended solution of solutes consisting essentially of polyethersulfone polymer and a phenoxy resin polymer in a compatible solvent, forming the resulting solution in a film, quenching the film in a quenching medium, and drying the resulting film to obtain the isotropic membrane, the amount of polyethersulfone polymer relative to the amount of phenoxy resin polymer being such that the strength and melting characteristics of the resulting isotropic membrane are superior to that of a comparable membrane made only with polyethersulfone polymer.

13. The process of claim 12 wherein the solvent is N-methylpyrrolidone.

14. The process of claim 12 wherein the quenching medium is water.

15. A process for filtering an aqueous fluid comprising causing said fluid to flow through a filtration membrane according to claim 1 having a porous matrix comprising a homogeneous copolymer blend of polyethersulfone polymer and a phenoxy resin polymer.

16. A process according to claim 15 wherein the membrane is a microporous membrane.

17. A process according to claim 15 wherein the membrane is an ultrafiltration membrane.

18. A process according to claim 15 wherein the polyethersulfone polymer comprises polymer having the formula $$[(C_6H_4\text{-}SO_2\text{-}C_6H_4\text{-}O)_n]$$

19. A process according to claim 15 wherein the phenoxy resin polymer comprises polymer having the formula

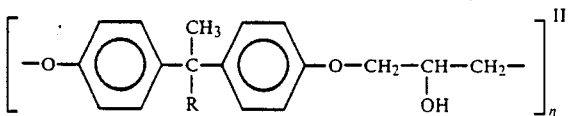

where R is methyl or ethyl.

20. A process according to claim 15 wherein the phenoxy resin polymer is a polyhydroxyether of bisphenol A or bisphenol B.

* * * * *

UNITED STATES PATENT AND TRADEMARK OFFICE
CERTIFICATE OF CORRECTION

PATENT NO. : 5,076,935
DATED : December 31, 1991
INVENTOR(S) : Menahem Kraus, et al It is certified that error appears in the above-identified patent and that said Letters Patent is hereby corrected as shown below:

On the title page

[75] Inventors, add --Mark Heisler, Saline, Michigan--;

Column 3, line 58, change "where is" to --where B is--;

Column 4, line 10, change "polyethesulfone" to --polyethersulfone--;

Column 8, line 10, change "polyethere-" to --polyether--.

Signed and Sealed this

Twentieth Day of April, 1993

Attest:

MICHAEL K. KIRK

*Attesting Officer*        Acting Commissioner of Patents and Trademarks